(12) United States Patent
Butcher et al.

(10) Patent No.: US 7,610,892 B2
(45) Date of Patent: Nov. 3, 2009

(54) SYSTEM AND METHOD FOR STARTING A VEHICLE

(75) Inventors: Jonathan Butcher, Dearborn, MI (US); Ryan McGee, Ann Arbor, MI (US); Fazal Syed, Canton, MI (US); Paul Gartner, Dearborn, MI (US); Shunsuke Okubo, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 11/161,098

(22) Filed: Jul. 22, 2005

(65) Prior Publication Data
US 2006/0016412 A1 Jan. 26, 2006

Related U.S. Application Data

(60) Provisional application No. 60/590,475, filed on Jul. 23, 2004.

(51) Int. Cl.
*F02N 11/00* (2006.01)
(52) U.S. Cl. .................................... 123/179.3
(58) Field of Classification Search ............. 123/179.3, 123/179.4
See application file for complete search history.

(56) References Cited

U.S. PATENT DOCUMENTS

| | | | |
|---|---|---|---|
| 4,024,408 A * | 5/1977 | Coleman et al. .......... 290/37 R |
| 4,619,237 A | 10/1986 | Auslander et al. | |
| 6,024,668 A | 2/2000 | Holbrook et al. | |
| 6,271,648 B1 | 8/2001 | Miller | |
| 6,714,854 B2 | 3/2004 | Linenberg et al. | |
| 7,028,657 B2 * | 4/2006 | Sah et al. ................. 123/179.3 |
| 7,072,759 B2 * | 7/2006 | Dolker ........................ 701/104 |
| 7,207,305 B2 * | 4/2007 | Dolker ..................... 123/179.3 |
| 2004/0007403 A1 | 1/2004 | Tomatsuri et al. | |
| 2004/0044462 A1 | 3/2004 | Linenberg et al. | |
| 2004/0045753 A1 | 3/2004 | Yamaguchi et al. | |

FOREIGN PATENT DOCUMENTS

| | | |
|---|---|---|
| DE | 19727595 | 1/1999 |
| JP | 07231509 | 8/1995 |
| JP | 08126115 | 5/1996 |
| JP | 2003286929 | 10/2003 |
| JP | 2004-340010 | * 12/2004 |
| JP | 2004340010 | 12/2004 |

* cited by examiner

*Primary Examiner*—Stephen K Cronin
*Assistant Examiner*—Arnold Castro
(74) *Attorney, Agent, or Firm*—David B. Kelley; Brooks Kushman P.C.

(57) ABSTRACT

The present invention provides a system and method for starting a vehicle in a cold temperature environment and minimizing the time spent by the vehicle within a resonance frequency zone during operation. The present invention includes a method of starting a vehicle engine comprising adjusting the speed of the engine during an engine start mode in accordance with a fixed value threshold. The method also includes determining whether the engine speed has reached the fixed value threshold or whether a time-based threshold has been reached. The method further includes transitioning out of the engine start mode into a normal operating mode when either the fixed value threshold or the time-based threshold has been reached.

21 Claims, 3 Drawing Sheets

SYSTEM AND METHOD FOR STARTING A VEHICLE

CROSS-REFERENCE TO RELATED APPLICATIONS

This application claims the benefit of U.S. provisional application Ser. No. 60/590,475 filed Jul. 23, 2004.

TECHNICAL FIELD

The present invention relates to a method of starting a vehicle in a cold temperature environment.

BACKGROUND

Hybrid electric vehicles (HEVs) utilize both an internal combustion engine and one or more electric machines (e.g. motors/generators) to generate power and torque. The electric motor/generator within a HEV provides the vehicle with additional degrees of freedom in delivering the driver-demanded torque and is also typically used to start the vehicle's engine.

Conventionally, the internal combustion engine is connected to the one or more electric machines through the use of a shaft. The shaft has a damper coupled thereto whose purpose is to isolate the transmission from fluctuations in the internal combustion engine torque output. However, the damper has a characteristic resonance frequency that causes amplification of vibrations and oscillations experienced by the shaft. These vibrations and oscillations become audible to a vehicle operator and are undesirable.

Nevertheless, in order to start the vehicle's engine, the starter/generator receives power from an onboard electrical power supply such as a battery. During cold temperature starting conditions, these batteries provide limited performance. The temperature of the battery can drastically affect its power output and energy storage capacity.

Efforts have been made to overcome the cold starting limitations associated with conventional HEV starting systems. These efforts include utilizing different battery technologies in parallel, self-heating the battery core by use of resistive elements, and providing an auxiliary climate control system for the battery. However, these systems require additional hardware and packaging considerations that increase cost and system complexity.

The present invention was conceived in view of these and other disadvantages of conventional systems.

SUMMARY

The present invention provides a system and method for starting a hybrid, electric vehicle (HEV) in a cold temperature environment. The present invention includes a method of starting a vehicle engine that includes adjusting the speed of the engine during an engine start mode in accordance with a fixed value threshold. The method also includes determining whether the engine speed has reached the fixed value threshold or whether a time-based threshold has been reached. The method further includes transitioning out of the engine start mode into a normal operating mode when either the fixed value threshold or the time-based threshold has been reached. The method includes commanding a first target engine speed that is at least the same as the fixed value threshold.

The present invention also provides a system for a vehicle comprising an engine and a control system communicative with the engine and having at least one controller. The control system is also configured to generate a first signal for adjusting the speed of the engine in accordance with a fixed value threshold. The control system is further configured to determine whether the engine speed has reached the fixed value threshold or whether a time-based threshold has been reached. The control system is also configured to transition to a second operating mode when either the fixed value threshold or the time-based threshold has been reached.

BRIEF DESCRIPTION OF THE DRAWINGS

These and other features and advantages of the invention will be apparent from the following detailed description and the appendant claims, taken in conjunction with the accompanying drawings, in which:

DETAILED DESCRIPTION OF THE PREFERRED EMBODIMENTS

By way of example, a preferred system and methodology for implementing the present invention is described below. The provided system and methodology may be adapted, modified or rearranged to best-fit a particular implementation without departing from the scope of the present invention.

Figure 1:
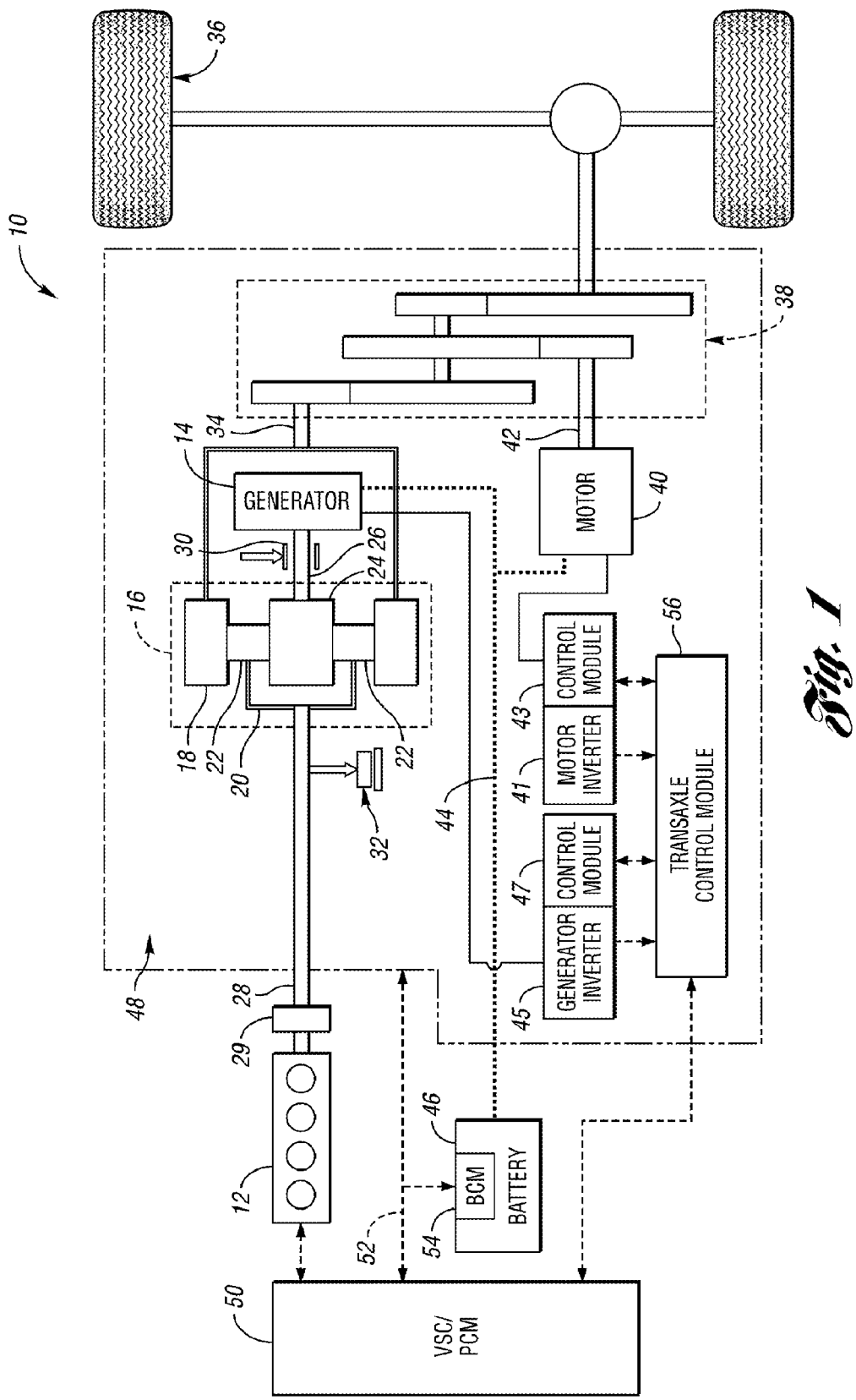
FIG. 1 is a schematic representation of an exemplary vehicle in accordance with an embodiment of the present invention.

FIG. 1 illustrates a schematic representation of a vehicle 10 in accordance with one embodiment of the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. A damper 29 is coupled to the shaft 28 and is configured to isolate the planetary gear set 16 from fluctuations in the output torque of the engine 12. In one embodiment, the shaft 28 is comprised of two separate shafts that are coupled together by the damper 29.

A brake 30 is provided for stopping rotation of the shaft 26, thereby locking the sun gear 24 in place. Because this configuration allows torque to be transferred from the generator 14 to the engine 12, a one-way clutch 32 is provided so that the shaft 28 rotates in only one direction. Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 through a second gear set 38. The vehicle 10 includes a second electric machine, or motor 40, which can be used to output torque to a shaft 42. Other vehicles within the scope of the present invention may have different electric machine arrangements, such as more or less than two electric machines. In the embodiment shown in FIG. 1, the motor 40 and the generator 14 can both be used as motors to output torque. Alternatively, each can also be used as a generator, outputting electrical power to a high voltage bus 44 and to an energy storage device, or battery 46.

The battery 46 is a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

As shown in FIG. 1, the motor 40, the generator 14, the planetary gear set 16, and a portion of the second gear set 38 may generally be referred to as a transaxle 48. The transaxle 48 is analogous to a transmission in a conventional vehicle. Thus, when a driver selects a particular gear, the transaxle 48 is appropriately controlled to provide that gear. To control the engine 12 and the components of the transaxle 48—e.g., the generator 14 and motor 40—a control system, including a controller 50, is provided. As shown in FIG. 1, the controller 50 is a combination vehicle system controller and powertrain control module (VSC/PCM). Although it is shown as a single hardware device, it may include multiple controllers in the form of multiple hardware devices, or multiple software controllers within one or more hardware devices.

A controller area network (CAN) 52 allows the VSC/PCM 50 to communicate with the transaxle 48 and a battery control mode (BCM) 54. Just as the battery 46 has the BCM 54, other devices controlled by the VSC/PCM 50 may have their own controllers. For example, an engine control unit (ECU) may communicate with the VSC/PCM 50 and may perform control functions on the engine 12. In addition, the transaxle 48 may include one or more controllers, such as a transaxle control module (TCM) 56, configured to control specific components within the transaxle 48, such as the generator 14 and/or the motor 40. Accordingly, as shown in FIG. 1, the TCM 56 communicates with a generator inverter 45 and a motor inverter 41. In one embodiment, the generator inverter 45 and the motor inverter 41 are each coupled to a control module 47 and a control module 43, respectively. Control modules 43 and 47 are capable of converting raw vehicle sensor data readings to a format compatible with the TCM 56 and sending those readings to the TCM 56.

Although the vehicle 10, shown in FIG. 1, is an HEV, it is understood that the present invention contemplates the use of other types of vehicles. In addition, although the vehicle 10 shown in FIG. 1 is a parallel-series HEV, the present invention is not limited to HEV's having such a "powersplit" configuration.

Figure 2A:
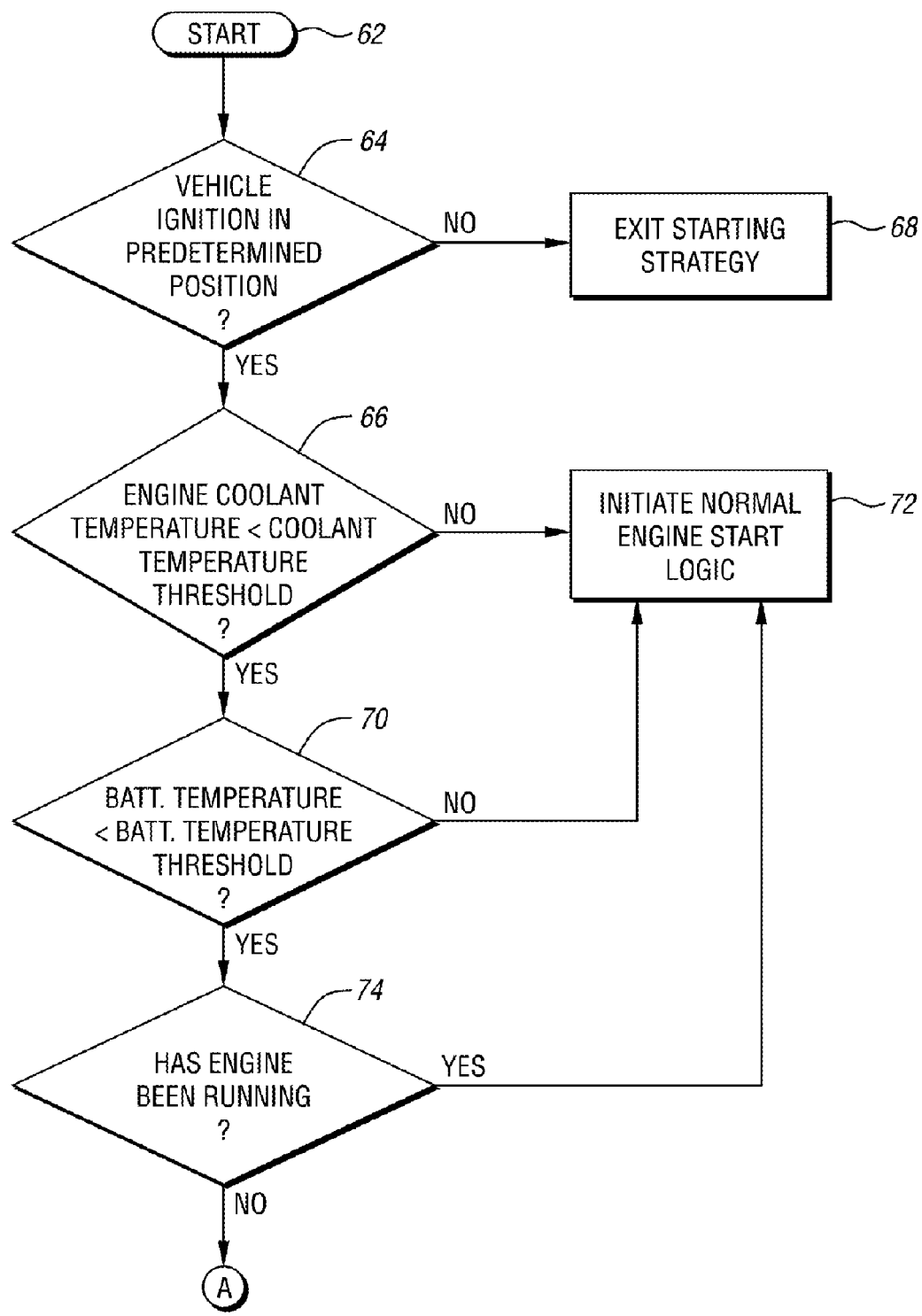
FIGS. 2a and 2b are flow charts of a method of starting a vehicle according to an embodiment of the invention.
Figure 2B:
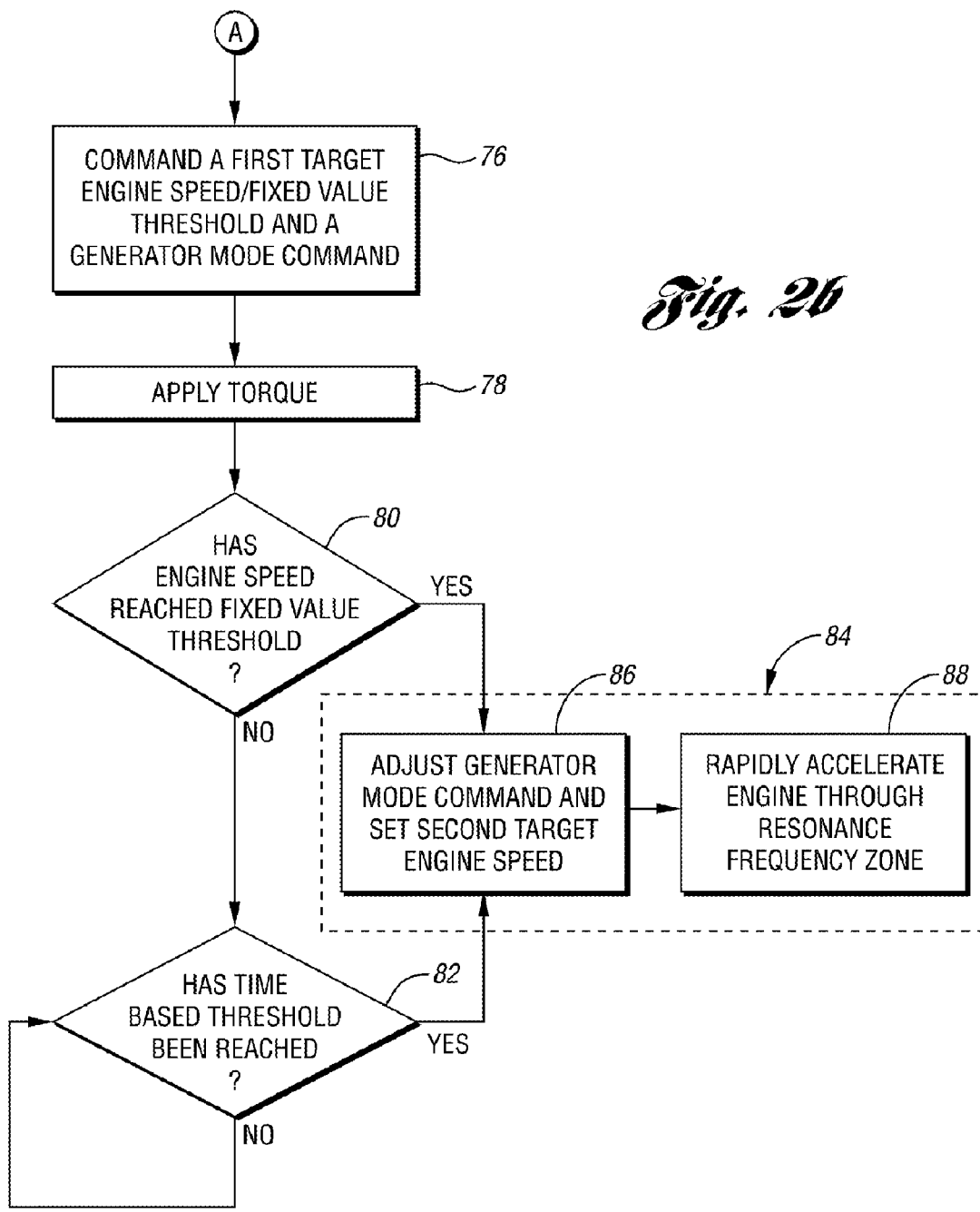

Referring to FIGS. 2a and 2b, the flow diagrams illustrate a method of starting the engine 12 in extreme cold temperatures and transitioning from an engine start mode to a normal operating mode in a manner that minimizes the time spent by vehicle 10 in a resonance frequency zone. A step 62 is the entry point into the methodology. At a step 64, the method determines whether the vehicle ignition is in a predetermined position. The predetermined position may be the "on," "accessory" or "start" position. If the vehicle ignition is not in the predetermined position, a step 68 occurs where the starting strategy is ended.

When the vehicle ignition is in the predetermined position, a step 66 occurs wherein the method determines whether the engine coolant temperature is less than a coolant temperature threshold. The step 66 (along with a step 70) enables the VSC/PCM 50 to determine whether or not a cold temperature environment exists. When the engine coolant temperature is greater than the coolant temperature threshold, a step 72 occurs. At a step 72, it has been determined that a cold temperature environment does not exist and the methodology initiates a normal engine start logic. When the engine coolant temperature is less than the coolant temperature threshold, a step 70 occurs. At the step 70, the method determines whether the battery temperature is less than a battery temperature threshold. When the battery temperature is greater than the battery temperature threshold, the step 72 occurs where the normal engine start logic is initiated. When the battery temperature is less than the battery temperature threshold, a step 74 occurs. At the step 74, the method determines whether or not the engine has been "running" prior to the current vehicle ignition key cycle. In one aspect of the invention, the determination that the vehicle has been running reduces the likelihood that the vehicle 10 should use the cold temperature starting methodology, although the ambient temperature may be considered a "cold" temperature.

Accordingly, if the vehicle has been running prior to the current vehicle ignition key cycle, the step 72 occurs, wherein the normal engine start logic is utilized. If the engine has not been running prior to the current vehicle ignition key cycle, a step 76 occurs (FIG. 2b). At the step 76, which occurs during an engine start mode, the VSC/PCM 50 sets a first fixed value threshold and generates a generator mode command. In one embodiment, the fixed value threshold corresponds to particular engine speed (i.e., target engine speed).

The generator mode command directs the generator 14 to apply the necessary torque to achieve the target engine speed. In one embodiment, the generator mode command is configured to allow the generator 14 to apply only a positive torque to the engine 12 to increase the speed of the engine 12. In such an embodiment, the generator mode command functions as a one-sided speed control. The one-sided speed control would allow the generator 14 to increase the engine speed but not allow the generator to reduce the engine speed even if the engine happens to spin faster than the target engine speed. Accordingly, at a step 78, the generator 14 applies torque to the engine 12. Additionally, in one aspect of the invention, the engine start mode enables the engine speed to increase only when combustion is strong enough to do so. In this manner, excessive high voltage battery power to spin the engine to a high speed is avoided and the engine's combustion provides the power to increase the engine speed above a target cranking speed.

At a step 80, the methodology, through the use of the VSC/PCM 50, determines whether the engine speed has reached the fixed value threshold. The step 80 enables determination of whether the engine 12 has entered a running condition following the engine start mode. Such a determination further enables the vehicle 10 to anticipate approaching a resonance frequency speed. As such, the fixed value threshold target engine speed is set at a value that is greater than the speed required for cranking (i.e., the cranking speed) but less than the resonance frequency speed. If the engine speed has reached the fixed value threshold, the methodology enters the normal operating mode 84 wherein a step 86 and a step 88 occur. At the step 86, the VSC/PCM 50 adjusts the generator mode command and sets a second target engine speed in anticipation of the resonance frequency zone.

As recognized by one of ordinary skill in the art, the shaft 28 and damper 29 (FIG. 1) transition through a resonance frequency zone when operating. The resonance frequency zone is typically set by vehicle designers to minimize the effects of noise, vibration, and harshness (NVH) issues. As such, the step 86 is provided to minimize the amount of time the vehicle spends operating within the resonance frequency zone. Accordingly, the adjusted generator mode command and second target engine speed are established so as to cause an immediate increase in engine speed, thereby causing the shaft 28 and damper 29 to traverse the resonance frequency zone as quickly as possible. Thus, the second target engine speed is set at a speed that is greater than an upper resonance frequency speed of the resonance frequency zone. Following the step 86, a step 88 occurs wherein the engine 12, the shaft 28, and the damper 29 are rapidly accelerated through the resonance frequency zone by an application of torque from the generator 14 within a predetermined time period. In one embodiment, to minimize the time operating within the resonance frequency zone, the predetermined time period may be no more than 1.0 second. In yet another embodiment, the predetermined time period may be about 0.3 seconds. It is recognized however, that the predetermined time period may vary depending on design and performance requirements without departing from the scope of the present invention.

Referring back to the step 80, when the engine speed has not reached the fixed value threshold, a step 82 occurs. At a step 82, the VSC/PCM 50 determines whether a time-based threshold has been reached. The time-based threshold operates as an alternative or "last chance" opportunity for the VSC/PCM 50 to determine that the engine 12 is in an engine running state. This time-based threshold also protects the battery 46 by guarding against conditions where weak combustion is occurring. The time-based threshold also helps to minimize the time the vehicle spends operating in the resonance frequency zone.

In summary, at the step 82, the methodology automatically causes the control system 50 to enter the normal operating mode 84 when the time-based threshold has been reached. In one embodiment, the time-based threshold is about 0.5 seconds but may vary depending on design and performance requirements. As such, when the time-based threshold has been reached, although the fixed value threshold may not have been met, the step 86 occurs wherein the generator mode command is adjusted and the second target engine speed is set. As described above, the steps 86 and 88 enable rapid acceleration of the engine through the resonance frequency zone so as to minimize the time spent by the vehicle 10 in the resonance frequency zone.

While the best mode for carrying out the invention has been described in detail, those familiar with the art to which this invention relates will recognize various alternative designs and embodiments for practicing the invention as defined by the following claims.

What is claimed is:

1. A method of starting a vehicle engine, comprising:
   adjusting a speed of the engine during an engine start mode in accordance with a fixed value threshold;
   determining whether the engine speed has reached the fixed value threshold or whether a time-based threshold has been reached; and
   upon a determination that the engine speed has not reached the fixed value threshold, transitioning out of the engine start mode into a normal operating mode when the time-based threshold has been reached;
   wherein transitioning to the normal operating mode includes commanding a second target engine speed being greater than the fixed value threshold and adjusting the engine speed to achieve the second target engine speed.

2. A method according to claim 1, further including commanding a first target engine speed that is at least the same as the fixed value threshold.

3. A method according to claim 1, further comprising:
   transitioning out of the engine start mode into a normal operating mode when the fixed value threshold has been reached prior to the time-based threshold.

4. A method according to claim 3, wherein adjusting the engine speed to achieve the second target engine speed includes accelerating the engine through a resonance frequency zone within a predetermined time period.

5. A method according to claim 4, wherein the predetermined time period is no more than 1.0 second.

6. A method according to claim 4, wherein the predetermined time period is about 0.3 seconds.

7. A method according to claim 1, wherein a generator is adapted to increase or decrease the engine speed.

8. A method according to claim 1, further comprising:
   generating a generator mode command;
   wherein the adjusting step comprises adjusting a speed of the engine during an engine start mode in accordance with a fixed value threshold and the generator mode command.

9. A method according to claim 1, wherein adjusting the engine speed of the engine during the engine start mode includes applying a torque to the engine through the use of a generator.

10. A method according to claim 9, wherein applying a torque to the engine through the use of a generator includes applying only a positive torque to the engine to increase the speed of the engine.

11. A method according to claim 1, wherein determining whether the engine speed has reached a fixed value threshold includes determining whether the engine speed is greater than an engine cranking speed and less than a resonance frequency speed.

12. A method of starting a vehicle having at least one engine in a cold environment, comprising:
   configuring an engine start mode for the vehicle that includes achieving either a fixed value threshold or a time-based threshold; and
   transitioning into a normal operating mode that includes accelerating the engine through a resonance frequency zone within a predetermined time period when the time-based threshold is reached despite the fixed value threshold not being reached, wherein the resonance frequency zone has a lower and an upper resonance frequency speed.

13. A method according to claim 12, wherein accelerating the engine through a resonance frequency zone within a predetermined time period includes a predetermined time period of no more than 1.0 second.

14. A method according to claim 12, wherein transitioning into a normal operating mode that includes accelerating the engine through a resonance frequency zone further includes:
   commanding a second target engine speed, wherein the second target engine speed is greater than the upper resonance frequency speed; and
   adjusting the engine speed to achieve the second target engine speed.

15. A method according to claim 12, further comprising transitioning into a normal operating mode that includes accelerating the engine through a resonance frequency zone when the fixed value threshold is reached prior to the time-based threshold.

16. A system for a vehicle, comprising:
   an engine; and
   a control system communicative with the engine and having at least one controller, the control system being configured to:
   generate a first signal for adjusting the speed of the engine during a first operating mode in accordance with a fixed value threshold;

determine whether the engine speed has reached the fixed value threshold or whether a time-based threshold has been reached; and upon a determination that the engine speed has not reached the fixed value threshold, transition to a second operating mode when the time-based threshold has been reached;

wherein, upon transitioning to the second operating mode, the control system is further configured to command a second target engine speed being greater than the fixed value threshold and generate a second signal for adjusting the engine speed to achieve the second target engine speed.

17. A system according to claim 16, further comprising:

a generator adapted to receive the first signal for adjusting the speed of the engine in accordance with the fixed value threshold and apply a torque to the engine to adjust the engine speed;

a battery coupled to the generator; and a shaft having a damper attached thereto, the shaft being configured to couple the engine to the generator.

18. A system according to claim 16, wherein the control system is further configured to:

transition out of the first operating mode into the second operating mode when the fixed value threshold has been reached prior to the time-based threshold.

19. A system according to claim 16, wherein the control system being configured to generate the second signal for adjusting the engine speed is further configured to:

effect the adjusting of the engine speed by causing a acceleration of the engine through a resonance frequency zone within a predetermined time period.

20. A method of starting a vehicle engine comprising:

adjusting a speed of engine during an engine start mode in accordance with a fixed value threshold;

determining whether a time-based threshold has been reached; and upon determining that the time-based threshold has been reached without the fixed value threshold being reached, transitioning out of the engine start mode into a normal operating mode that includes accelerating the engine through a resonance frequency zone within a predetermined time period.

21. The method of claim 20, further comprising:

otherwise, determining whether the engine speed has reached the fixed value threshold;

upon determining that the fixed value threshold has been reached, transitioning out of the engine staff mode into the normal operating mode.

* * * * *

UNITED STATES PATENT AND TRADEMARK OFFICE
CERTIFICATE OF CORRECTION

PATENT NO. : 7,610,892 B2
APPLICATION NO. : 11/161098
DATED : November 3, 2009
INVENTOR(S) : Butcher et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 425 days.

Signed and Sealed this

Twelfth Day of October, 2010

David J. Kappos
*Director of the United States Patent and Trademark Office*